(12) United States Patent
Lu et al.

(10) Patent No.: US 9,584,630 B2
(45) Date of Patent: Feb. 28, 2017

(54) LIGHT WEIGHT PROTOCOL AND AGENT IN A NETWORK COMMUNICATION

(75) Inventors: Guang Lu, Dollard-des-Ormeaux (CA); Michelle Perras, Montréal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 72 days.

(21) Appl. No.: 13/095,593

(22) Filed: Apr. 27, 2011

(65) Prior Publication Data
US 2012/0110192 A1 May 3, 2012

Related U.S. Application Data

(60) Provisional application No. 61/329,711, filed on Apr. 30, 2010.

(51) Int. Cl.
*G06F 15/16* (2006.01)
*H04L 29/06* (2006.01)

(52) U.S. Cl.
CPC ............. *H04L 69/08* (2013.01); *H04L 69/10* (2013.01); *H04L 69/18* (2013.01)

(58) Field of Classification Search
CPC ........... H04L 29/06027; H04L 61/2564; H04L 61/1529; H04L 61/2514; H04W 36/0022; H04W 88/06; H04W 12/08; H04W 4/16; H04W 8/26; G06F 17/289; G06F 17/30902; G06F 17/3056
USPC .................. 709/227, 230, 246, 217, 219
See application file for complete search history.

(56) References Cited

U.S. PATENT DOCUMENTS

| | | | | |
|---|---|---|---|---|
| 6,678,733 | B1 * | 1/2004 | Brown et al. ................. | 709/229 |
| 7,296,022 | B2 * | 11/2007 | Harjanto | |
| 8,085,808 | B2 * | 12/2011 | Brusca et al. ................ | 370/466 |
| 8,099,456 | B2 * | 1/2012 | Harjanto ....................... | 709/203 |
| 8,112,800 | B1 * | 2/2012 | Yang ..................... | G06F 21/554 |
| | | | | 726/22 |
| 8,291,495 | B1 * | 10/2012 | Burns ................. | H04L 63/0254 |
| | | | | 455/410 |
| 8,392,497 | B2 * | 3/2013 | Vilke et al. .................... | 709/202 |
| 8,509,071 | B1 * | 8/2013 | Narayanaswamy | H04L 41/5025 |
| | | | | 370/230 |
| 2002/0099827 | A1 * | 7/2002 | Shah et al. .................... | 709/227 |

(Continued)

FOREIGN PATENT DOCUMENTS

EP 1865687 A1 12/2007
EP 1942628 A1 7/2008
(Continued)

*Primary Examiner* — Benjamin M Thieu
(74) *Attorney, Agent, or Firm* — Condo Roccia Koptiw LLP

(57) ABSTRACT

Systems and methods are provided for using a light weight protocol (LWP) and protocol agent in a network communication system. A protocol agent receives a message in LWP from an end node. The message in LWP is directed to a destination network node that uses a network protocol that the end node is incapable of supporting, such as Hypertext Transfer Protocol (HTTP), Real Time Streaming Protocol (RTSP), Session Initiation Protocol (SIP) or other network protocols. The protocol agent determines a network protocol to map the message to, and generates a message in the determined network protocol based on the received LWP message. The protocol agent then sends the generated message to the destination network node.

14 Claims, 11 Drawing Sheets

(56) References Cited

U.S. PATENT DOCUMENTS

| | | |
|---|---|---|
| 2002/0099851 A1 | 7/2002 | Shah et al. |
| 2002/0147645 A1* | 10/2002 | Alao et al. .................. 705/14 |
| 2003/0088876 A1* | 5/2003 | Mao et al. .................. 725/91 |
| 2003/0120502 A1* | 6/2003 | Robb et al. .................. 705/1 |
| 2003/0129969 A1* | 7/2003 | Rucinski .................. 455/412 |
| 2004/0049702 A1* | 3/2004 | Subramaniam et al. ..... 713/201 |
| 2004/0087307 A1* | 5/2004 | Ibe et al. .................. 455/436 |
| 2004/0109473 A1 | 6/2004 | Lebizay et al. |
| 2004/0210633 A1* | 10/2004 | Brown et al. .................. 709/203 |
| 2005/0198299 A1* | 9/2005 | Beck et al. .................. 709/226 |
| 2005/0226250 A1 | 10/2005 | Makayama et al. |
| 2005/0273459 A1* | 12/2005 | Moore et al. .................. 707/1 |
| 2006/0280165 A1* | 12/2006 | Blumenschein .. H04L 29/06027 370/352 |
| 2007/0005804 A1* | 1/2007 | Rideout .................. 709/246 |
| 2007/0019545 A1* | 1/2007 | Alt et al. .................. 370/230 |
| 2007/0094691 A1* | 4/2007 | Gazdzinski .................. 725/62 |
| 2007/0127519 A1* | 6/2007 | Hasek et al. .................. 370/466 |
| 2007/0280236 A1* | 12/2007 | Yang .................. H04L 12/185 370/390 |
| 2008/0052344 A1* | 2/2008 | Alecci et al. .................. 709/203 |
| 2008/0080414 A1* | 4/2008 | Thubert et al. .................. 370/328 |
| 2008/0263194 A1* | 10/2008 | Choi et al. .................. 709/224 |
| 2009/0003380 A1* | 1/2009 | Jackson .................. 370/466 |
| 2009/0225760 A1* | 9/2009 | Foti .................. H04L 67/142 370/400 |
| 2009/0259736 A1* | 10/2009 | Chang .................. G06F 9/505 709/221 |
| 2009/0319659 A1* | 12/2009 | Terasaki .................. H04L 63/1416 709/224 |
| 2010/0095367 A1* | 4/2010 | Narayanaswamy H04L 63/0245 726/12 |
| 2010/0192225 A1* | 7/2010 | Ma .................. G06F 17/30985 726/23 |
| 2010/0235585 A1* | 9/2010 | Dowlatkhah .................. 711/136 |
| 2010/0281539 A1* | 11/2010 | Burns .................. H04L 63/1441 726/23 |
| 2011/0047230 A1* | 2/2011 | McGee .................. 709/206 |
| 2011/0173490 A1* | 7/2011 | Narayanaswamy H04L 63/1408 714/4.11 |
| 2012/0016955 A1* | 1/2012 | Twitchell, Jr. ........ H04L 45/586 709/217 |

FOREIGN PATENT DOCUMENTS

| | | |
|---|---|---|
| JP | 2002-157175 A | 5/2002 |
| WO | WO 02/28123 A2 | 4/2002 |
| WO | WO 03/107611 A1 | 12/2003 |
| WO | WO 2006/075335 A2 | 7/2006 |

* cited by examiner

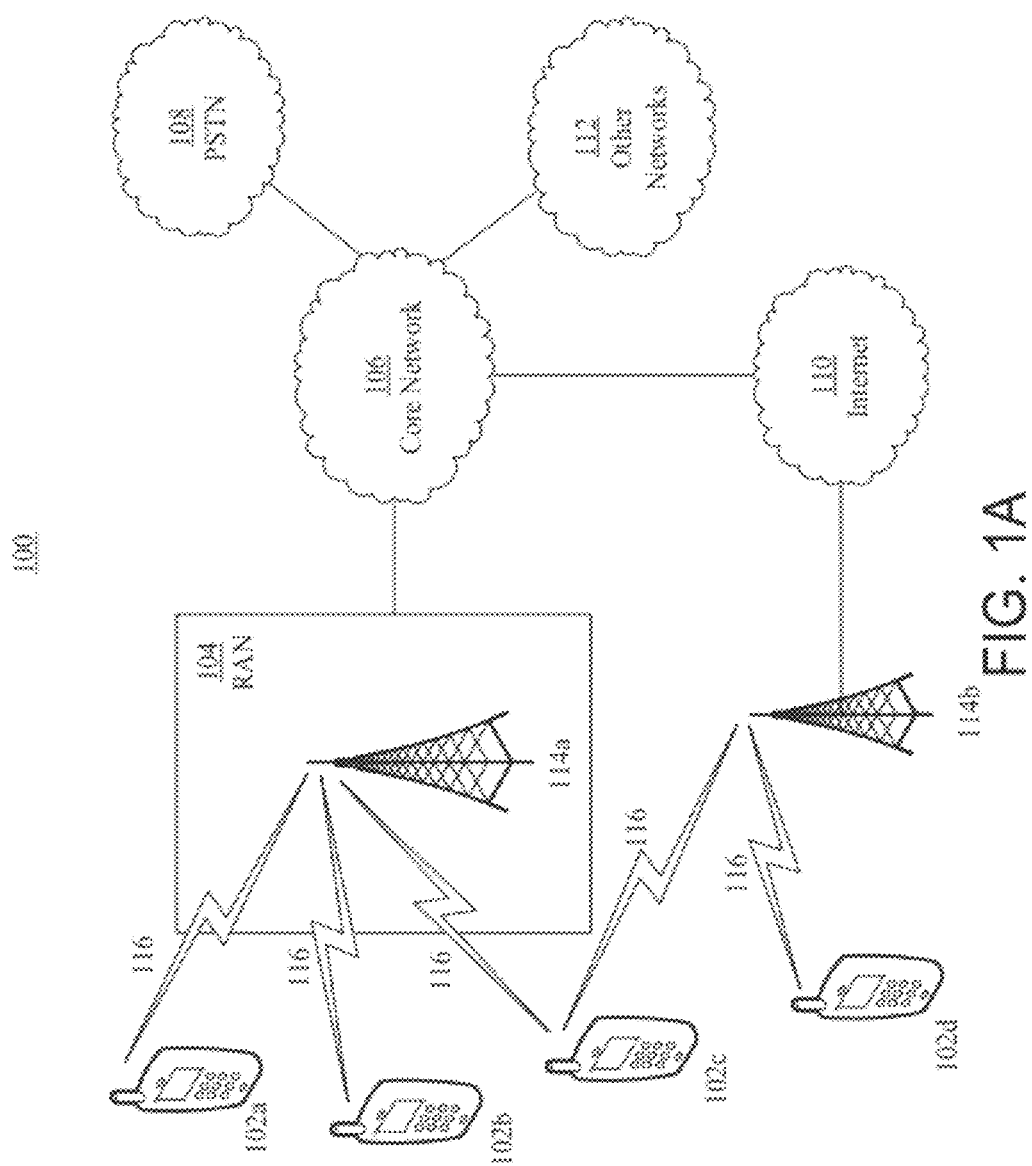

LIGHT WEIGHT PROTOCOL AND AGENT IN A NETWORK COMMUNICATION

CROSS REFERENCE

This application claims the benefit of U.S. Provisional Application No. 61/329,711 filed on Apr. 30, 2010, which is incorporated herein by reference as if fully set forth.

BACKGROUND

In current network architectures, there may be many protocols serving different purposes and working for different applications. Such protocols include, for example, Hypertext Transfer Protocol (HTTP), Real Time Streaming Protocol (RTSP), and Session Initiation Protocol (SIP). For the protocols to properly function, end nodes in the network need to maintain a full stack. This increases the complexity of managing the end nodes since an end node must maintain its own protocol stack for multiple protocols.

In the context of some networks such as the Internet, end node devices are not limited to intelligent computing devices such as a desktop computer, laptop computer, or server. Rather, devices connected to the network may include, for example, a phone, a household appliance, a machine, building equipment, a remote control, and the like. Currently, network end node devices may need to use protocols that are heavy in overhead and require significant resources. Particularly, the protocols may require significant bandwidth, especially when the network connection is wireless. With the proliferation of the number of protocols and number of end nodes, the complexity and effort needed to manage such network architectures are significant. Therefore, there may be a need for simplifying network protocol architecture.

SUMMARY

Systems and methods are provided for using a light weight protocol (LWP) in a network communication system. A protocol agent server may serve as an interface between end node devices that use LWP and network nodes that use network protocols such as Hypertext Transfer Protocol (HTTP), Real Time Streaming Protocol (RTSP), Session Initiation Protocol (SIP) or other network protocols.

In an embodiment, a protocol agent server may receive a message in LWP from an end node. The LWP message may indicate a destination or target network node. The target network node may use a network protocol that the end node is incapable of supporting, such as HTTP, RTSP, and SIP. The protocol agent server may determine a network protocol to map the message to. For example, the determination may be made based on the content of the message, such as the application type and/or the destination network node as specified in the message. The protocol agent server may map the received LWP message to one or more message in the determined network protocol, and may generate a second message using the determined network protocol. The protocol agent server may send the generated message(s) to the destination network node.

In an embodiment, the protocol agent server may receive a message in a protocol that the end node does not support. The protocol agent server may map the message to one or more LWP messages, and may generate LWP message(s) based on the received message. The protocol agent server may send the generated LWP message(s) to the end node.

BRIEF DESCRIPTION OF THE DRAWINGS

FIG. 1A is a system diagram of an example communications system in which one or more disclosed embodiments may be implemented.

DETAILED DESCRIPTION OF ILLUSTRATIVE EMBODIMENTS

Figure 1B:
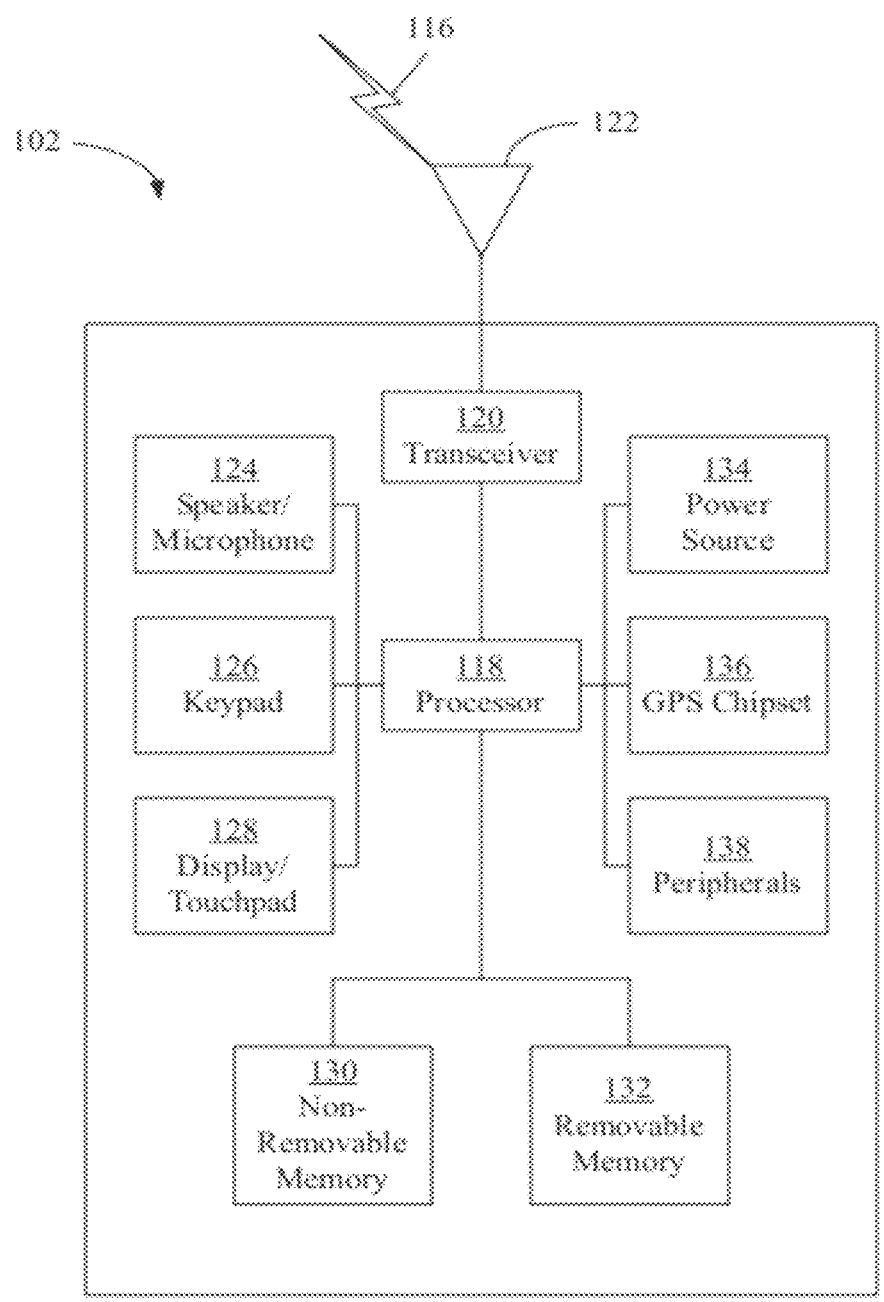
FIG. 1B is a system diagram of an example wireless transmit/receive unit (WTRU) that may be used within the communications system illustrated in FIG. 1A.

Disclosed herein are systems and methods for using a light weight protocol (LWP) and agent in a network communication system. These systems and methods provide a network-based protocol agent mechanism for simplifying end node management by reducing protocol complexity at the end node. For example, a protocol agent server may serve as an interface between end node devices that use LWP and network nodes that use network protocols such as Hypertext Transfer Protocol (HTTP), Real Time Streaming Protocol (RTSP), Session Initiation Protocol (SIP) or other network protocols.

A detailed description of illustrative embodiments of the embodiments will now be described with reference to FIGS. 1-6. Although this description provides a detailed example of possible embodiments, it should be noted that the details are intended to be exemplary and in no way limit the scope of the disclosed embodiments.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The core network 106 may include at least one transceiver and at least one processor. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
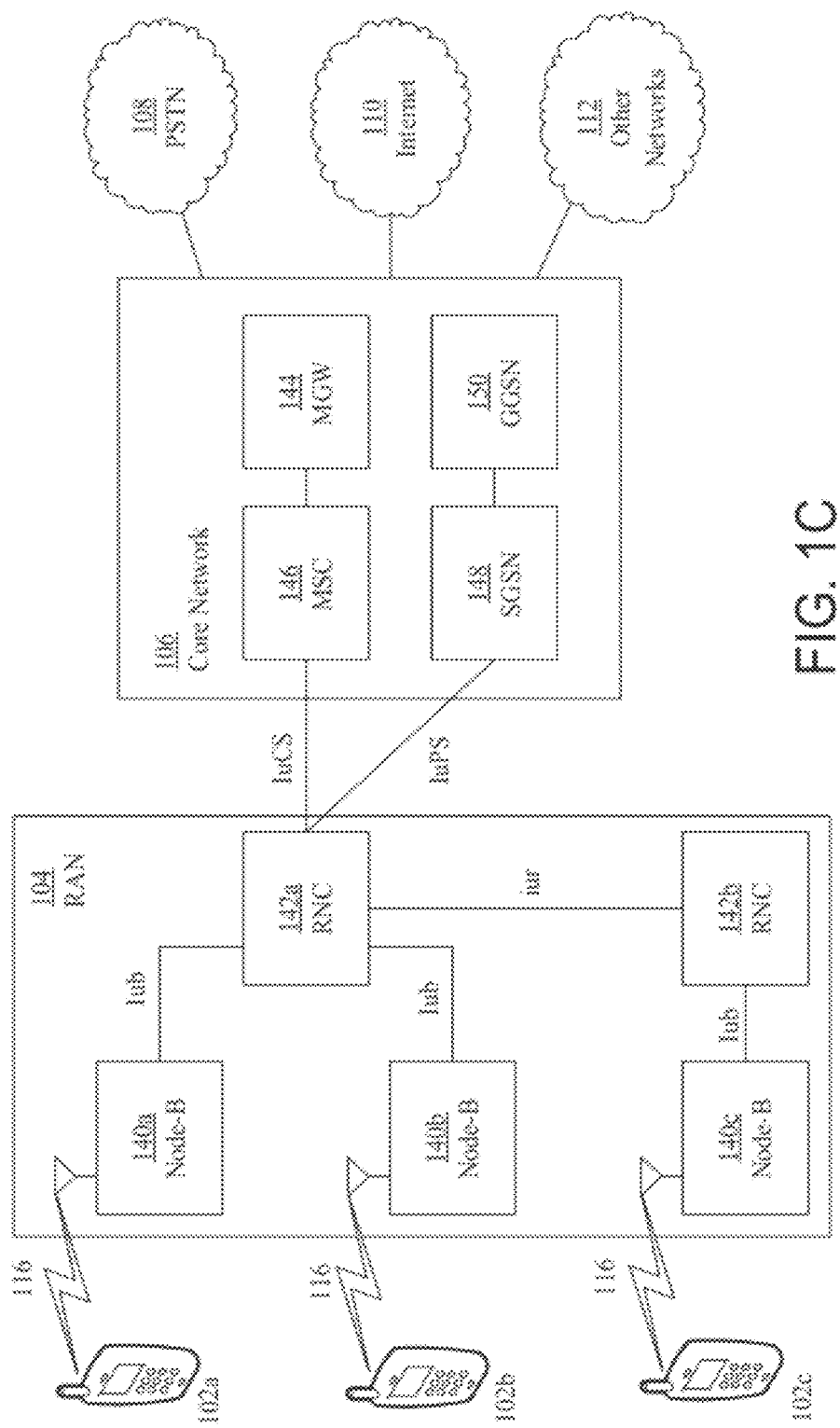
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b and 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
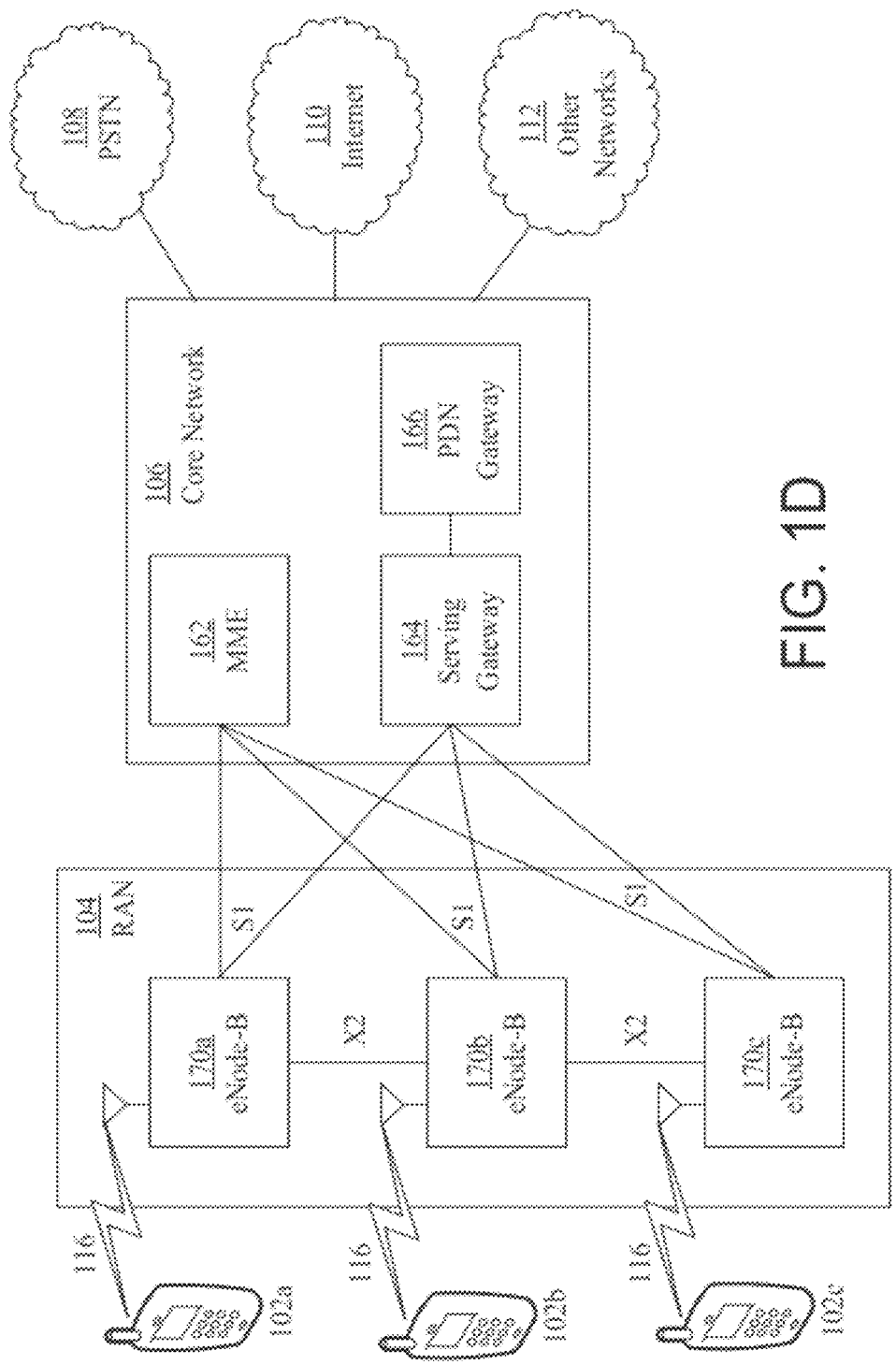
FIG. 1D is a system diagram of an example radio access network and an example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 170a, 170b, 170c, though it will be appreciated that the RAN 104 may include any number of eNode-Bs while remaining consistent with an embodiment. The eNode-Bs 170a, 170b, 170c may each include one or more transceivers for communicating with the WTRUs 102a, 102b, 102c over the air interface 116. In an embodiment, the eNode-Bs 170a, 170b, 170c may implement MIMO technology. Thus, the eNode-B 140a, for example, may use multiple antennas to transmit wireless signals to, and receive wireless signals from, the WTRU 102a.

Each of the eNode-Bs 170a, 170b, 170c may be associated with a particular cell (not shown) and may be configured to handle radio resource management decisions, handover decisions, scheduling of users in the uplink and/or downlink, and the like. As shown in FIG. 1D, the eNode-Bs 170a, 170b, 170c may communicate with one another over an X2 interface.

The core network (CN) 106 shown in FIG. 1D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 170a, 170b, 170c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 170a, 170b, 170c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
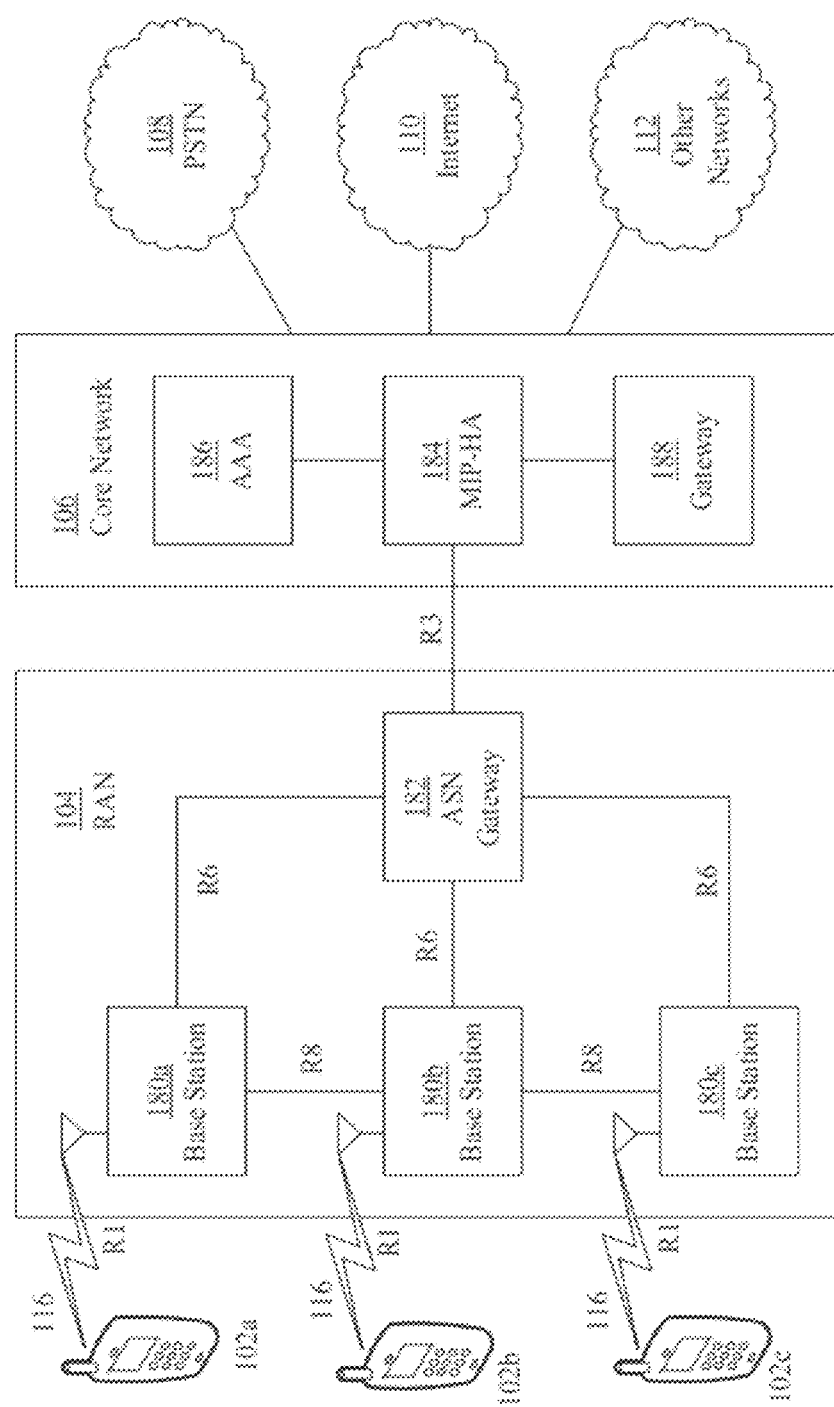
FIG. 1E is a system diagram of an example radio access network and an example core network that may be used within the communications system illustrated in FIG. 1A.

FIG. 1E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 180a, 180b, 180c, and an ASN gateway 142, though it will be appreciated that the RAN 104 may include any number of base stations and ASN gateways while remaining consistent with an embodiment. The base stations 180a, 180b, 180c may each be associated with a particular cell (not shown) in the RAN 104 and may each include one or more transceivers for communicating with the WTRUs 102a, 102b, 102c over the air interface 116. In one embodiment, the base stations 180*a*, 180*b*, 180*c* may implement MIMO technology. Thus, the base station 140*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 106, and the like.

The air interface 116 between the WTRUs 102*a*, 102*b*, 102*c* and the RAN 104 may be defined as an R1 reference point that implements the IEEE 802.16 specification. In addition, each of the WTRUs 102*a*, 102*b*, 102*c* may establish a logical interface (not shown) with the core network 106. The logical interface between the WTRUs 102*a*, 102*b*, 102*c* and the core network 106 may be defined as an R2 reference point, which may be used for authentication, authorization, IP host configuration management, and/or mobility management. The communication link between each of the base stations 180*a*, 180*b*, 180*c* may be defined as an R8 reference point that includes protocols for facilitating WTRU handovers and the transfer of data between base stations. The communication link between the base stations 180*a*, 180*b*, 180*c* and the ASN gateway 215 may be defined as an R6 reference point. The R6 reference point may include protocols for facilitating mobility management based on mobility events associated with each of the WTRUs 102*a*, 102*b*, 102*c*.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include one or more network devices such as a mobile IP home agent (MIP-HA) 184, an authentication, authorization, accounting (AAA) server 186, and a gateway 188. While each of the foregoing elements are depicted as part of the core network 106, it will be appreciated that any one of these elements may be owned and/or operated by an entity other than the core network operator.

The MIP-HA 184 may be responsible for IP address management, and may enable the WTRUs 102*a*, 102*b*, 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102*a*, 102*b*, 102*c* between the RAN 104 and the other ASNs. The communication link between the core network 106 and the other core networks may be defined as an R5 reference, which may include protocols for facilitating interworking between home core networks and visited core networks.

Figure 2A:
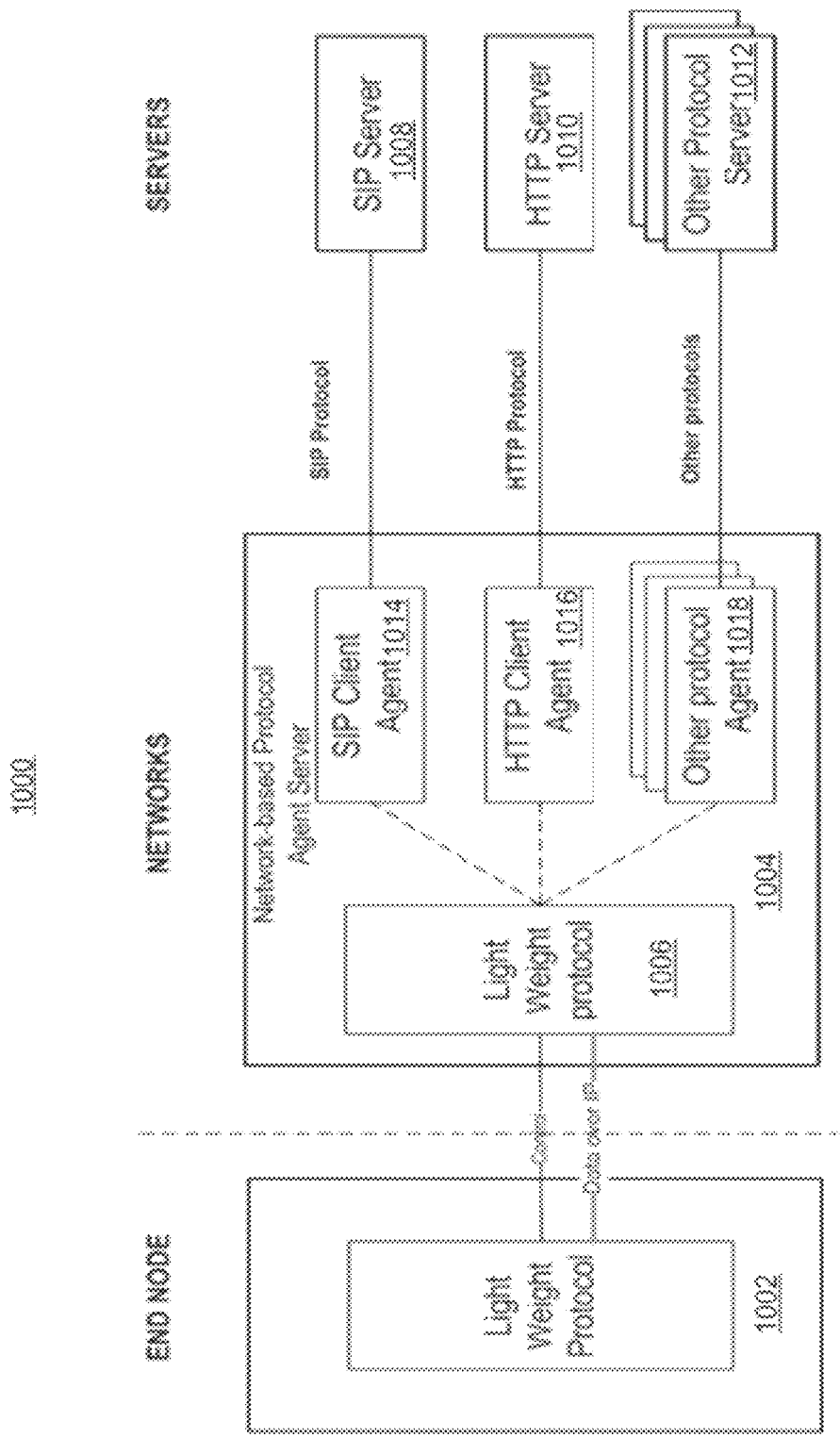
FIG. 2A illustrates a diagram of an exemplary network communication system including an end node that uses LWP.

FIG. 2A illustrates a diagram of an exemplary network communication system 1000 including an end node 1002 that uses a Light weight protocol (LWP). An end node may include a computing device such as a computer, a phone, a household appliance, a machine, a remote control. For example, an end node may include a WTRU 102 as described with respect to FIGS. 1A-1E. In an embodiment, the end node 1002 may support a minimum number of protocols. For example, the end node 1002 may not directly support protocols such as SIP, HTTP, RTSP or other network protocols.

Referring to FIG. 2A, the end node 1002 may use the LWP on the Internet Protocol (IP) for communication with a network-based protocol agent server 1004. The network-based protocol agent server may include at least one processor such as the processor 118 described with respect to FIG. 1B. The network-based protocol agent server may include at least one transceiver such as the transceiver 120 described with respect to FIG. 1B. For example, the transceiver for sending and receiving messages in LWP, and/or legacy protocols such as SIP, HTTP, RTSP or other network protocols.

An LWP client agent 1006 may reside on the server 1004 and may be configured to interpret LWP messages and/or data received from the end node 1002. The end node 1002 may be in communication with one or more other networks, and network nodes such as servers, and computers via a wireless or wired connection. The servers may include, for example, but not limited to, a SIP server 1008, an HTTP server 1010, or any various other protocol servers 1012. Although, in this example, the end node 1002 may use the LWP operating on top of IP, the LWP and associated network architecture may operate with any lower layer protocol.

The LWP client agent 1006 may include an interface between the end node 1002 and one or more protocol agents that may support other network protocols. The LWP client agent 1006 may map LWP actions communicated from the end node 1002 to other protocol actions, and communicate corresponding signals to other network nodes or devices according to the other protocols. For example, LWP actions may be mapped to corresponding SIP actions for signal communication to the SIP server 1008. For example, LWP actions may be mapped to corresponding HTTP actions for signal communication to the HTTP server 1010. The LWP client agent 1006 may be in operative communication with a SIP client agent 1014 for communicating SIP protocol signals to the SIP server 1008.

The LWP client agent 1006 may be in operative communication with an HTTP client agent 1016 for communicating HTTP protocol signals to the HTTP server 1010. The LWP client agent 1006 may be in operative communication with various other protocol agents 1018 for communicating various other protocol signals to the other protocol servers 1012.

Figure 2B:
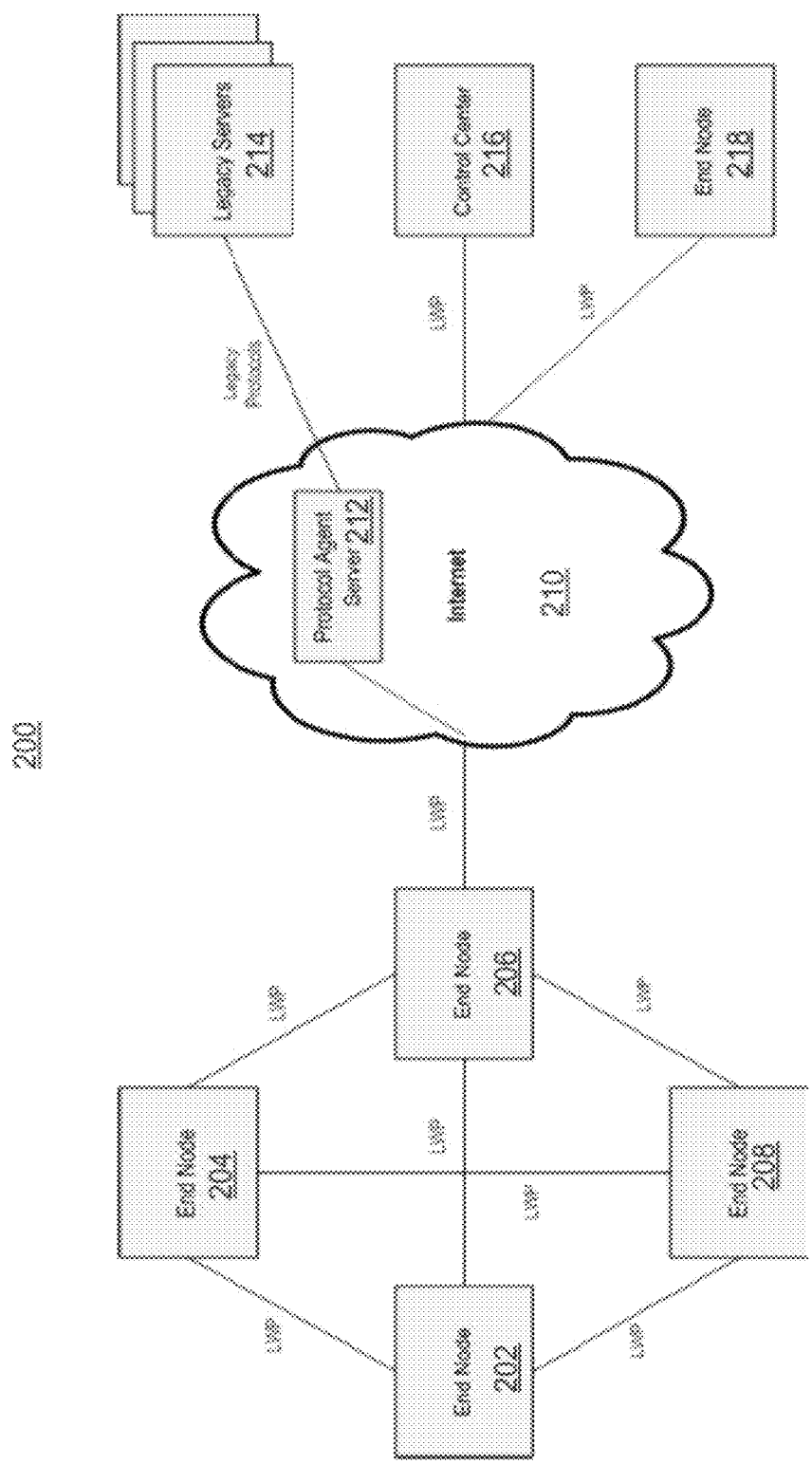
FIG. 2B illustrates a diagram of another exemplary network communication system including multiple end nodes that each uses the LWP for communicating among one another and the Internet.

FIG. 2B illustrates a diagram of an exemplary network communication system 200. Referring to FIG. 2B, the network communication system 200 may include multiple end nodes such as end nodes 202, 204, 206, and 208. The end nodes 202, 204, 206 and 208 may use the LWP for communicating among one another and the Internet 210. The end nodes 202, 204, 206 and 208 may be configured in a local network. For example, end nodes 202, 204, 206, and 208 may be configured together in a home or personal area network. The end nodes 202, 204, 206 and 208 may be connected wirelessly, via a wired connection, or a combination thereof.

As shown, one or more of the end nodes 202, 204, 206 and 208 may be connected to the Internet 210 via LWP. For example, the end node 206 may be connected to the Internet 210 via LWP. The Internet 210 may include a protocol agent server 212 such as the network-based protocol agent server 1004 described in FIG. 2A. The protocol agent server 212 may be configured with an LWP client agent and one or more protocol client agents. As shown in FIG. 2B, the protocol agent server 212 may communicate signals between any of the end nodes 202, 204, 206 and 208 and legacy servers 214.

As shown in FIG. 2B, the Internet 212 may be communicatively connected to a control center 216 and another end node 218. For example, the protocol agent server 212 may communicate signals with the control center 216. The protocol agent server 212 may communicate signals with the end node 218. For example, one or more of the end nodes 202, 204, 206 and 208 may send signals to or receive signals from the control center 216. The one or more of the end nodes 202, 204, 206 and 208 may send signals to or receive signals from and/or the end node 218 using LWP. LWP may be used end-to-end across the Internet 212 to communicate signals between one or more of the end nodes 202, 204, 206 and 208 and the control center 216 or the end node 218.

LWP may simplify the Internet Protocol structure and may reduce signaling required between an end node and network. As a result, traffic over-the-air may be reduced in a wireless environment. In addition, LWP and its related techniques and systems may reduce the cost and effort needed to maintain multiple protocols at each end node. LWP may be advantageous, for example, to devices with limited resources and capabilities such as smart grid devices or home automation devices. LWP may increase interoperability between devices, because LWP may be sufficiently generic to support many different types of client-server interfaces.

In an embodiment, LWP may include a protocol between two entities. The two entities may include two end nodes, or may include an end node and a protocol agent server residing in a network. LWP may be session-oriented. For example, a session may be established between the LWP client on the end node and the LWP client agent.

The transport protocol used by LWP may include, for example, but not limited to, UDP/TCP over IP, or any other suitable protocol. In the case of using TCP, for example, a TCP session may be kept for a predetermined period of time. For example, a TCP session may be kept only for a transaction (e.g., a request/response transaction) and re-established as needed.

LWP may support one or more messages such as request, response, indication, and/or acknowledgment. A request message may flow from or to an end node. For example, an end node may use a request message to make different types of requests, depending on the contents of the request message, such as "application type" and "action." A response message may correspond to a request message. The response message may include a response to a corresponding request message with a status. The response message may include another request message, or may be included in a request message. An indication message may flow from or to an end node. The indication message may be used by an end node to push a message for control and/or data. An acknowledgment message may flow from or to an end node. The acknowledgment message may be used to acknowledge a received message. In an embodiment, sending an acknowledgment message may be optional. LWP may rely underneath protocols, such as, but not limited to, TCP for reliability.

For example, LWP may support one or more application types such as streaming and/session control. LWP may support streaming actions such as start, stop, play, pause, resume, forward, rewind, data, and the like, such that a streaming session may be controlled and data may be transported. LWP may support session control actions such as connection, disconnect, cancel, retrieve information, terminate indication, and the like, such that a session maybe established, modified, and torn down.

In an embodiment, LWP messages may be characteristically small with respect to data size. For example, binary format data may be used. For example, ASCII format data may be used.

An LWP message may contain a variety of data types. For example, an LWP message may include a session ID for uniquely identifying an LWP communication session. A party such as an end node initiating an LWP session may include the session ID in the initial message.

An LWP message may specify an application type, an action type, status, a URL, a position, data, and/or any combination thereof. The application type may identify the type of communication between the network nodes. For example, the application type may specify whether the LWP session is real-time streaming, downloading, Voice over IP (VoIP), etc. The action type may identify an action defining the operation that the end node expects. The value of the action type may vary depending on the application type. For example, if the application type is "streaming," the action type may be play, stop, pause, etc. The status may include different status codes for the LWP session. An end node may specify, for example, a URL to play. An end node may, for example, provide keywords and/or request that the protocol client agent server search for relevant URLs. An end node may specify a position, e.g., the starting point of video or audio data. An LWP message may also include data to be communicated to another end node. LWP messages may include other control elements.

Figure 3:
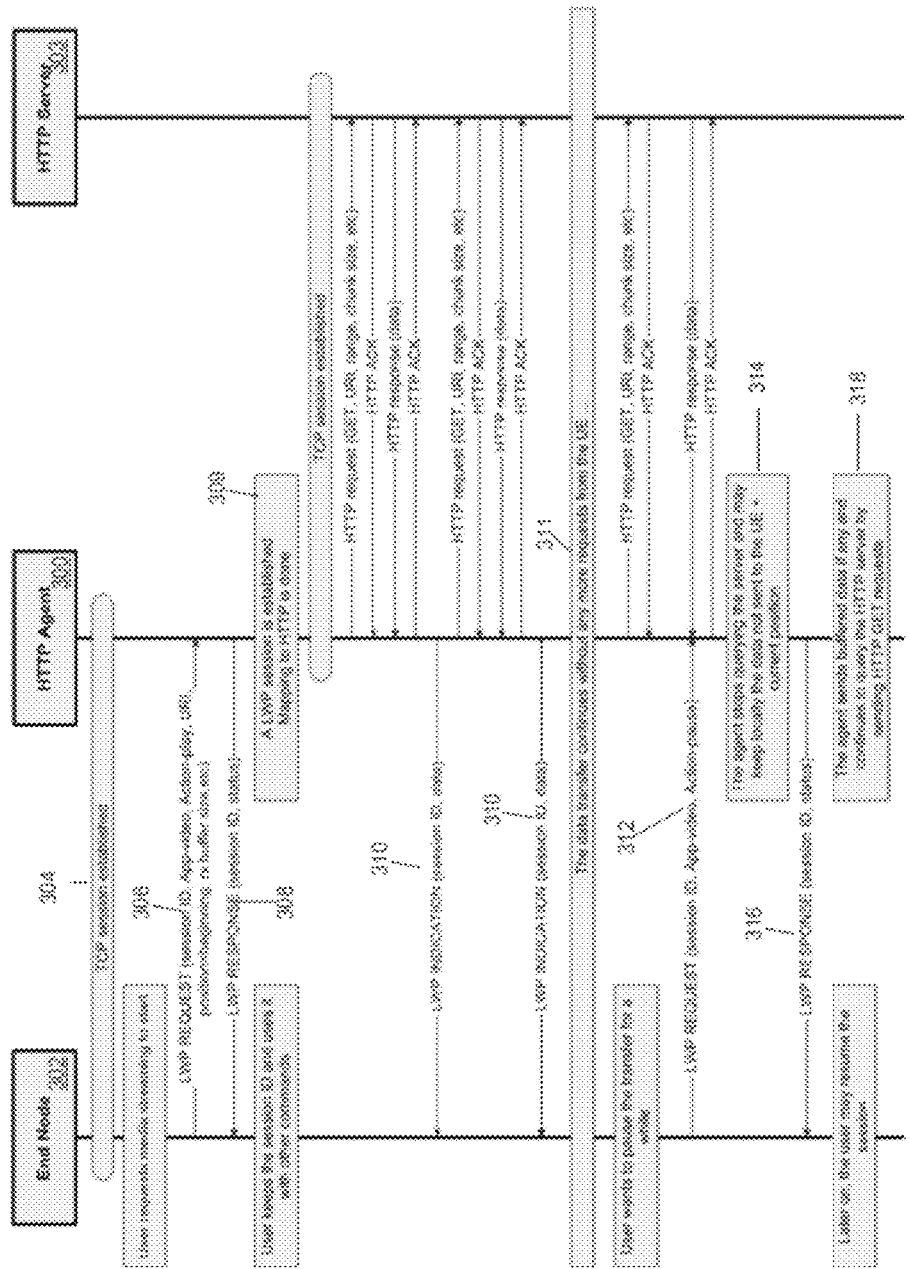
FIG. 3 illustrates a message diagram of an exemplary call flow using an HTTP client agent.

FIG. 3 illustrates a message diagram of an exemplary call flow using an HTTP client agent 300. An end node 302 may request media streaming of video from an HTTP server 303. The HTTP client agent 300 may include LWP client agent and an HTTP client agent, such as the LWP client agent 1006 and the HTTP client agent 1016 described above with respect to FIG. 2A.

Referring to FIG. 3, at 304, a TCP session may be established between an end node 302 and the HTTP client agent 300 as understood by those of skill in the art. At 306, an LWP request message may be received at the HTTP client agent 300. For example, a user of the end node 302 may operate the end node 302. In response to a user indication, the end node 302 may request media streaming to start. For example, the end node 302 may generate an LWP request message and communicate the LWP request message to the HTTP client agent 300. The LWP request message may include a session ID, information indicative of the LWP application type as being video (streaming type media), information indicative of the action as play, information indicative of a destination network node such as a URL, information indicative of a position as the beginning of the video, data size, and the like.

At 308, an LWP response message may be sent. In response to the receipt of the LWP request message, an LWP response message may be generated and communicate the LWP response message to the end node 302. For example, the LWP response message may be generated and communicated by the LWP client agent. The LWP response message may include the session ID in the request message. Subsequent commands relating to the media streaming request may include the same session ID. The LWP response message may include a status of the request, such as request is approved.

As shown, at 309, an LWP session may be established. Based on the content of the received LWP request message, it may be determined that the LWP message should be mapped to one or more HTTP messages via the HTTP client agent 300. The HTTP client agent 300 may map the content of the LWP request message to one or more HTTP messages. For example, the HTTP client agent 300 may establish a TCP session with a HTTP server such as the HTTP server 303. In this TCP session, the HTTP client agent 300 may generate one or more HTTP messages based on the LWP request message received at 306, and LWP-to-HTTP mapping. For example, the HTTP client agent 300 may send an HTTP request messages that may map to the LWP request message for the video to the HTTP server 303. The HTTP client agent 300 may receive an HTTP acknowledgment messages from the HTTP server 303. The HTTP client agent 300 may receive HTTP response messages from the HTTP server 303 for providing the requested video.

At 310, the HTTP agent may send the end node 302 LWP indication messages. When media stream data such as video data is received at the HTTP client agent 300, the HTTP client agent may map the corresponding HTTP response message to an LWP indication message that may carry the media stream data. The LWP indication message may then be communicated to the end node 302. The LWP indication message may include the session ID that may identify the LWP session. For example, the session ID may be the same as the session ID in the request message. The LWP indication message may include data, such as the video data being streamed. At 311, data transfer between the end node 302 and the HTTP server may continue without further requests from the end node 302.

At 312, the HTTP client agent 300 may receive a second LWP request message. For example, the user of the end node 302 may operate the end node for pausing the transfer of the video data. The end node 302 may generate an LWP request message including the session ID, identifying the application as video, and identifying the requested action as "pause." The LWP request message may be communicated to the HTTP client agent 300. At 314, in response to receipt of the LWP request message, the HTTP client agent 300 may stop querying the HTTP server 303, may store locally data not sent to the end node 302, and may store the position of the video data that has not been communicated to the end node 302. At 316, the HTTP client agent 300 may generate and communicate an LWP response message including the session ID and status information. After the video transfer has been paused, the end node 302 may control the resumption of the video transfer session. In response, at 318, the HTTP client agent 300 may communicate the buffered video data, if any, that has not been sent to the end node 302, and continue to query the HTTP server 303 for any additional video data.

LWP actions may be mapped to one or more HTTP messages. For example, a start action may flow from an LWP end node to an HTTP Agent, and may not map to an HTTP message. A stop action may flow from an LWP end node to an HTTP Agent, and may not map to an HTTP message. A play action may flow from an LWP end node to an HTTP Agent, and may map to an HTTP GET request message. A pause action may flow from an LWP end node to an HTTP Agent, and may map to an HTTP PUT request message. The HTTP PUT request message may include bookmarking information. A resume action may flow from an LWP end node to an HTTP Agent, and may map to an HTTP GET request message with bookmarking information. A forward action may flow from an LWP end node to an HTTP Agent, and may map to an HTTP GET request message. The HTTP GET request message may include the chunk size for forwarding. A rewind action may flow from an LWP end node to an HTTP Agent, and may map to an HTTP GET request message. The HTTP GET request message may include the chunk size for rewinding. A data indication action may flow from an HTTP Agent to an LWP end node, and may map to an HTTP response message. The response message may include data such as media stream data. A data request action may flow from an LWP end node to an HTTP Agent, and may map to an HTTP PUT/POST request message. The HTTP PUT/POST request message may include data associated with the data request.

Figure 4:
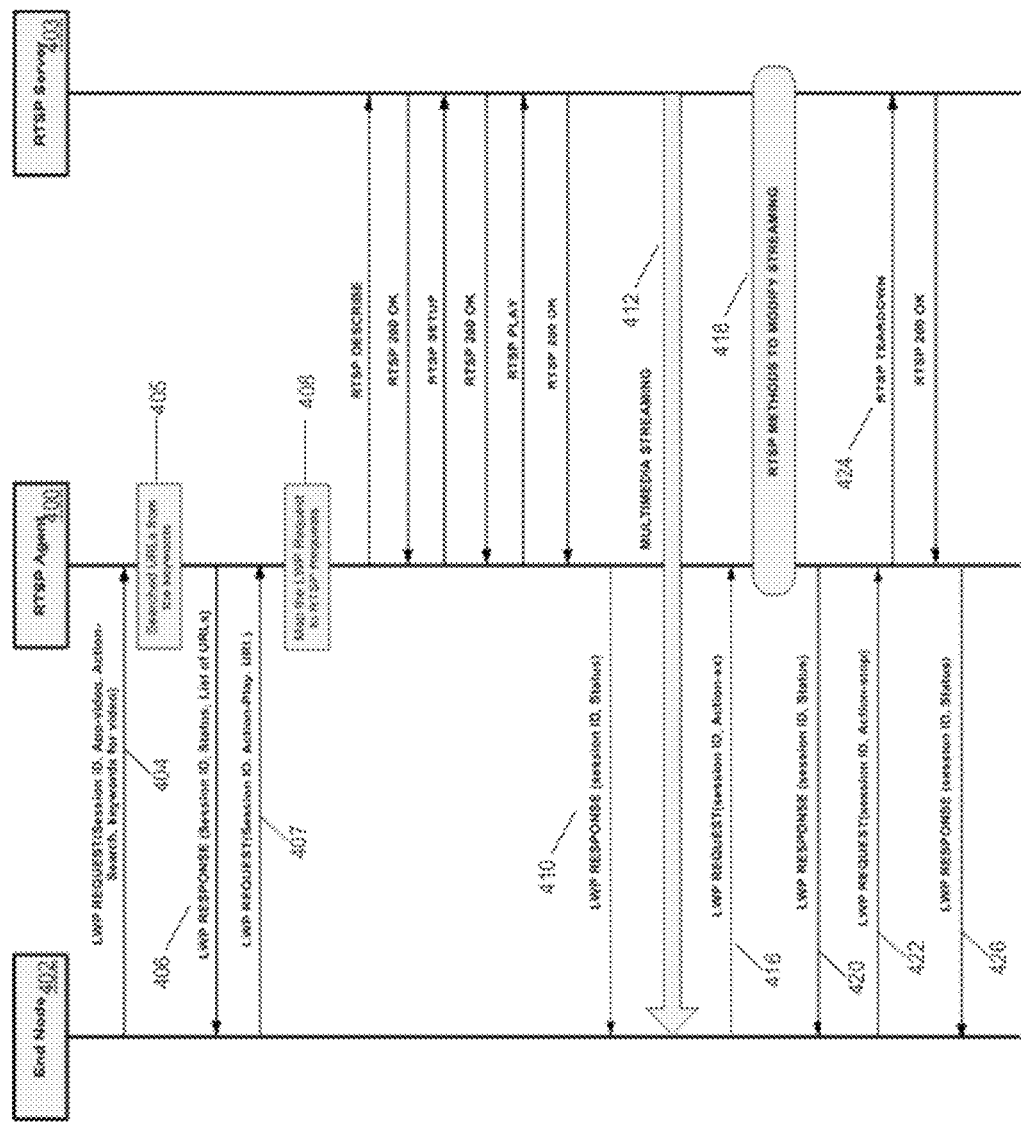
FIG. 4 illustrates a message diagram of an exemplary call flow using an RTSP client agent.

FIG. 4 illustrates a message diagram of an exemplary call flow using an RTSP client agent 400. The RTSP client agent 400 may include an LWP client agent 1006 and a protocol agent 1018 described above with respect to FIG. 2A.

As shown, an RTSP server 403 may receive an LWP request message at 404. For example, an end node 402 may request media streaming of video from an RTSP server such as RTSP server 403. The end node 402 may not have the identification of a URL containing video associated with one or more keywords. The end node 402 may generate an LWP request identifying the session ID, identifying the application as video, identifying the action as search for searching for video, and/or identifying keywords for the video. The keywords may be used for searching for the video.

At 405, the RTSP client agent 400 may search URLs using the keywords contained in the LWP request message. At 406, the RTSP client agent 400 may generate and communicate to the end node 402 an LWP response message identifying the session ID, identifying status information, and listing URLs uncovered in the search. At 407, the RTSP client agent 400 may receive an LWP request message identifying the session ID, indicating that the action is play, and identifying a selected URL to play. For example, in response to receipt of the LWP response message, the end node 402 may generate and communicate to the RTSP client agent 400 the LWP request message identifying the session ID, indicating that the action is play, and identifying a selected URL to play.

At 408, the RTSP client agent 400 may map the LWP request message to RTSP requests for communication to the RTSP server 403. Based on the content of the LWP request message, it may be determined that the LWP request message should be mapped to one or more RTSP messages. For example, the RTSP client agent 400 may generate one or more RTSP messages, and may exchange RTSP messages with the RTSP server 403 for playing the selected URL. As shown, the RTSP client agent 400 may send an RTSP describe message to the RTSP server 403 based on the LWP REQUEST message(s) received from the end node 402. The RTSP client agent 400 may receive an RTSP 200 OK message from the RTSP server 403. The RTSP client agent 400 may send an RTSP setup message to the RTSP server 403. The RTSP client agent 400 may receive an RTSP 200 OK message from the RTSP server 403. The RTSP client agent 400 may send an RTSP play message to the RTSP server 403. The RTSP client agent 400 may receive an RTSP 200 OK message from the RTSP server 403. As shown, a data streaming session may be established using two LWP messages such as an LWP request message and an LWP response message, and six RTSP messages between the RTSP client agent 400 and the RSP server 403. In other words, the number of LWP messages required for establishing an IP phone call may be less than the number of RTSP messages required for establishing such a call. Thus, the use of LWP reduces the number of messages sent and received by the end nodes such as the end node 402.

At 410, the RTSP client agent 400 may generate and communicate to the end node 402 an LWP response message that indicates the session ID and status information. At 412, multimedia content may be streamed from the RTSP server 403 to the end node 402.

At 416, the RTSP client agent 400 may receive an LWP request message identifying the session ID and a specified action. The action may be to modify the streaming of the multimedia content. The multimedia streaming may be paused, forwarded, or the like. For example, the end node 402 may generate and communicate to the RTSP client agent 400 the LWP REQUEST.

As shown, at 418, the RTSP client agent 400 may communicate with the RTSP server 403 using RTSP protocol for modifying the streaming as specified. At 420, the RTSP client agent 400 may generate and communicate to the end node 402 an LWP response message indicating the session ID and the status information.

At 422, the RTSP client agent 400 may receive an LWP request message identifying the session ID and a specified action. For example, the specified action may be to stop steaming the multimedia content. The end node 402 may communicate to the RTSP client agent 400 the LWP request message identifying the session ID and requesting that the multimedia streaming to stop. At 424, the RTSP client agent 400 may communicate an RTSP teardown message, via RTSP protocol, to the RTSP server 403 for stopping the streaming. The RTSP server 403 may acknowledge the message by sending an RTSP 200 OK message to the RTSP client agent 400. At 426, the RTSP client agent 400 may communicate an LWP response message to the end node 402 for indicating the status information such as the media streaming has been stopped and/or the RTSP communication session has been torn down.

LWP actions may be mapped to one or more RTSP messages. For example, a start action may flow from an LWP end node to an RTSP Agent, and may map to an RTSP DESCRIBE and/or SETUP message. A stop action may flow from an LWP end node to an RTSP Agent, and may map to an RTSP TEARDOWN message. A play action may flow from an LWP end node to an RTSP Agent, and may map to an RTSP PLAY message. A pause action may flow from an LWP end node to an RTSP Agent, and may map to an RTSP PAUSE message. A resume action may flow from LWP to an RTSP Agent, and may map to an RTSP PLAY message. A forward action may flow from an LWP end node to an RTSP Agent, and may map to an RTSP PLAY message identifying specific position and/or scale. A rewind action may flow from an LWP end node to an RTSP Agent, and may map to an RTSP PLAY message. The RTSP PLAY message may include specific position and scale. A data indication action may flow from an RTSP Agent to an LWP end node, and may map to an RTSP RESPONSE message. The RESPONSE message may include a 200 ok message for PLAY REQUEST(s). A data request action may flow from an LWP end node to an RTSP Agent, and may map to an RTSP request DESCRIBE and/or SETUP message.

Figure 5:
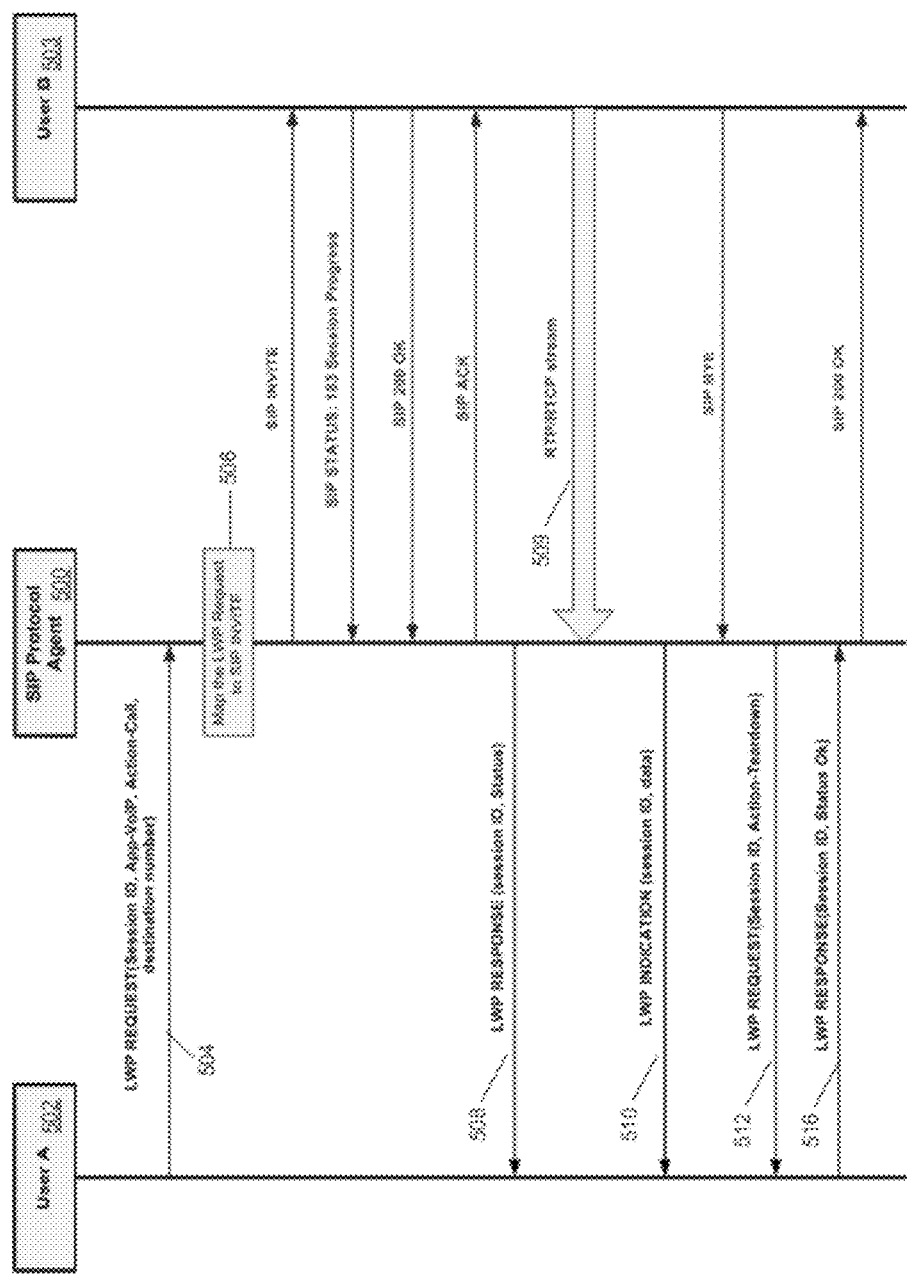
FIG. 5 illustrates a message diagram of an exemplary call flow using a SIP client.

FIG. 5 illustrates a message diagram of an exemplary call flow using a SIP client agent 500 for establishing an IP phone call. The SIP client agent 500 may include an LWP client agent and a SIP client agent, such as the LWP client agent 1006 and the SIP client agent 1014 described above with respect to FIG. 2A.

Referring to FIG. 5, at 504, the SIP client agent 500 may receive a LWP request message, indicating a session ID, identifying the application as VoIP, indicating the action is call, and indicating the destination network node of the phone call. For example, an end node 502 may request a call to a destination phone number of another end node 503. The end node 502 may generate and communicate the LWP request message to the SIP client agent 500.

As shown, at 506, the SIP client agent 500 may map the LWP request message to a SIP invite message. For example, the SIP client agent 500 may generate a SIP invite message and communicate to the end node 503 the SIP invite message for initiating a phone call between the end node 502 and the end node 503. The end node 503 may reply with a SIP status message and a SIP 200 OK message. The SIP client agent 500 may generate and communicate to the end node 503 a SIP ack message. At 508, the SIP client agent 500 may generate and communicate to the end node 502 an LWP response message indicating the session ID and status information. As shown, an IP phone call may be established using two LWP messages such as an LWP request message and an LWP response message, and four SIP messages between the SIP client agent 500 and the end node 503. In other words, the number of LWP messages required for establishing an IP phone call may be less than the number of SIP messages required for establishing such a call. Thus, the use of LWP reduces the number of messages sent and received by the end nodes such as the end node 502.

At 509, the SIP client agent 500 may receive an RTP/RTCP stream from the end node 503. For example, the end node 503 may generate and communicate to the SIP client agent 500 the RTP/RTCP stream. At 510, the SIP client agent 500 may send the streamed data to the end node 502 in an LWP indication message to the end node 502. The LWP indication message may include a session ID such as the session ID indicated in the LWP request message receive at 504.

At 512, the SIP client agent 500 may send an LWP request message to the end node 502. The LWP request message may indicate a teardown action, and may include a session ID the session ID indicated in the LWP request message receive at 504. For example, the SIP client agent 500 may receive a SIP BYE message from the end node 503. The end node 503 may terminate the call between end nodes 503 and 502 by communicating a SIP BYE message to the SIP client agent 500. At 516, the SIP client agent 500 may receive an LWP response message from the end node 502. The LWP response message may indicate the session ID and OK status. The SIP client agent 500 may communicate a SIP 200 OK message to the end node 503.

LWP actions may be mapped to one or more SIP messages. For example, a call action may flow from an LWP end node to an SIP Agent, and may map to an SIP INVITE, ACK and/or REGISTER message(s). A teardown action may flow from an LWP end node to an SIP Agent, and/or from an SIP Agent to an LWP end node. A teardown action may map to an SIP BYE message. A re-start action may flow from an LWP end node to an SIP Agent, and may map to an SIP RE-INVITE message. A cancel action may flow from an LWP end node to an SIP Agent, and may map to an SIP CANCEL message. A get info action may flow from an LWP end node to an SIP Agent, and may map to an SIP OPTIONS message.

Figure 6:
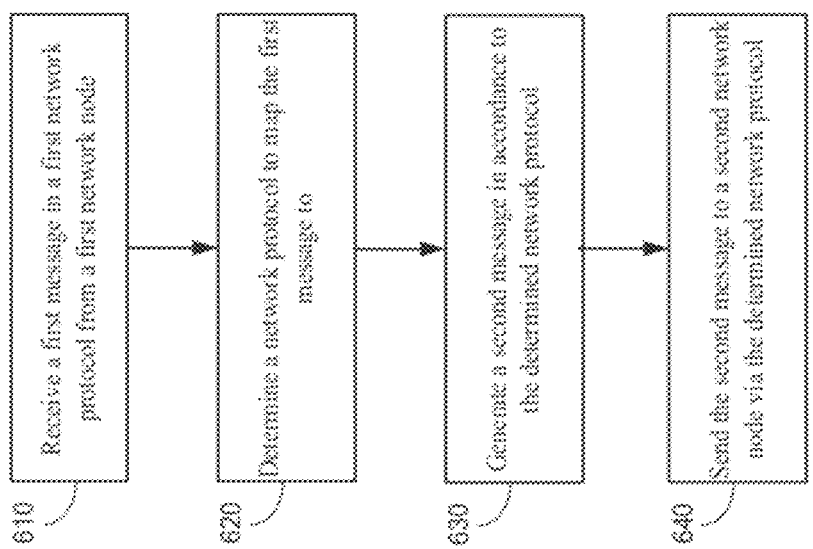
FIG. 6 illustrates an example process for facilitating a communication session between an end node and a network node.

FIG. 6 illustrates an example process for facilitating a communication session between an LWP end node and a network node. The steps illustrated in FIG. 6, may be carried out, for example, by the network-based protocol agent server 1004 described with respect to FIG. 2A.

As shown in FIG. 6, at 610, a first message may be received from a first network node. The first network node may include, for example, one or more of the end nodes 202-206 described with respect FIG. 2B. The first message may an LWP message. For example, the LWP message may include an LWP request message for making a request. The LWP message may include an LWP indication message that may push a message to a destination network node. The LWP message may include an LWP response message that may respond to a request message. The LWP message may include an LWP acknowledge message that may acknowledge that a message has been received.

At 620, a network protocol may be determined to map the first message to. For example, first message may include an application type field that may include information identifying the type of communication between the LWP end node and the destination network node. The network protocol may be determined based on the content of the application type field. For example, if the application type is video, HTTP protocol may be selected to map the first message to. For example, if the application type is voice over IP, SIP protocol may be selected to map the first message to. In an embodiment, network protocol may be determined based on the type of protocol that the destination network node supports. For example, if the destination network node is a RTSP server, RTSP protocol may be selected to map the first message to.

At 630, a second message may be generated in accordance with the determined network protocol. For example, the first message may be mapped to one or more messages in the determined network protocol. As described above, an LWP message may be mapped to one or more HTTP message, one or more SIP messages and/or one or more RTSP message. One or more message in the determined network protocol may be generated based on the content of the first message. At 640, the generated second message may be sent via the determined network protocol.

While the various embodiments have been described in connection with the various figures, it is to be understood that other similar embodiments may be used or modifications and additions may be made to the described embodiment for performing the same function of the various embodiments without deviating there from. Therefore, the embodiments should not be limited to any single embodiment, but rather should be construed in breadth and scope in accordance with the appended claims.

What is claimed:

1. A method for a network-side protocol agent to facilitate communication between network nodes, the method comprising:
    receiving a first message in accordance to a first network protocol from a first network node, wherein the first network protocol is configured to facilitate a plurality of communication types comprising media streaming, downloading, and voice over internet protocol (VoIP), and the first message comprises:
    application type information for identifying a communication type between the first network node and a second network node,
    a session identifier for uniquely identifying a communication session in the first network protocol,
    action type information,
    a message destination identifier for identifying a destination of the first message, and
    at least one of status information, position information for identifying a starting point of a media stream or data;
    establishing a communication session with the first network node;
    communicating with the second network node on behalf of the first network node in accordance to a second network protocol;
    forwarding data from the second network node to the first network node via the communication session with the first network node in accordance to the first network protocol;
    receiving a second message in accordance to the first network protocol from the first network node;
    determining a third network protocol to map the second message to based on an application type information indicated in the second message, the third network protocol being different from the second network protocol;
    generating a third message in accordance to the third network protocol based on the second message; and
    sending the third message to a third network node via the third network protocol.

2. The method of claim 1, wherein the first network protocol comprises a light weight protocol.

3. The method of claim 1, wherein the second network protocol comprises at least one of Hypertext Transfer Protocol (HTTP) protocol, Real Time Streaming Protocol (RTSP) protocol, or Session Initiation Protocol (SIP) protocol.

4. The method of claim 1, wherein the first network node comprises an end node incapable of supporting the second network protocol.

5. The method of claim 1, further comprising:
    sending a fourth message to the second network node in accordance with the second network protocol.

6. The method of claim 1, wherein the third network protocol to map the second message to is determined based on a destination network node information indicated in the second message.

7. A network-side protocol agent server comprising:
    a processor; and
    a memory having stored instructions that when executed by the processor cause the network-side protocol agent server to:
    receive a first message using light weight protocol from a first network node, wherein the network-side protocol agent server is configured to facilitate a plurality of communication types comprising media streaming, downloading, and voice over internet protocol (VoIP), and the first message comprises:
    application type information for identifying a communication type between the first network node and a second network node,
    a session identifier for uniquely identifying a communication session in the first network protocol,
    action type information,
    a message destination identifier for identifying a destination of the first message, and
    at least one of status information, position information for identifying a starting point of a media stream or data;

establish a communication session with the first network node using the light weight protocol based on the identified communication type;

communicate with the second network node on behalf of the first network node in accordance to a second network protocol based on the identified communication type;

forward data from the second network node to the first network node via the communication session with the first network node in accordance to the light weight protocol;

receive a second message in accordance to light weight protocol from the first network node;

determine a third network protocol to map the second message to based on an application type information indicated in the second message, the third network protocol being different from the second network protocol;

generate a third message in accordance to the third network protocol based on the second message; and send the third message to a third network node via the third network protocol.

8. The server of claim 7, wherein the memory has further stored instructions that when executed by the processor cause the network-side protocol agent server to send the second message to the second network node via the second network protocol.

9. The server of claim 7, further comprising at least one of:

a Session Initiation Protocol (SIP) client agent for communicating with a network node that supports SIP protocol;

a Hypertext Transfer Protocol (HTTP) client agent for communicating with a network node that supports HTTP protocol; or a Real Time Streaming Protocol (RTSP) client agent for communicating with a network node that supports RTSP protocol.

10. The server of claim 7, wherein the light weight protocol runs on top of UDP/TCP over IP.

11. The server of claim 7, wherein the first network node is incapable of generating messages using the second network protocol.

12. The server of claim 7, wherein the memory has further stored instructions that when executed by the processor cause the network-side protocol agent server to send a fourth message to a network end node that is incapable of interpreting messages in the second network protocol.

13. The server of claim 7, wherein the first message comprises a light weight protocol indication message for pushing a message to a network node.

14. The server of claim 7, wherein the light weight protocol supports session control.

* * * * *